United States Patent [19]

Sacca

[11] Patent Number: 5,692,042

[45] Date of Patent: Nov. 25, 1997

[54] SPEAKERPHONE CONTROLLED BY A COMPARATOR WITH HYSTERESIS

[75] Inventor: Frank Sacca, West Covina, Calif.

[73] Assignee: Casio PhoneMate, Inc., Torrance, Calif.

[21] Appl. No.: 455,227

[22] Filed: May 31, 1995

[51] Int. Cl.[6] .................................................. H04M 9/08
[52] U.S. Cl. ........................... 379/387; 379/388; 379/391
[58] Field of Search ..................................... 379/387, 388, 379/389, 390, 391, 407, 402, 406, 410

[56] References Cited

U.S. PATENT DOCUMENTS

| | | | |
|---|---|---|---|
| 3,725,585 | 4/1973 | Moniak et al. | 379/390 |
| 4,513,177 | 4/1985 | Nishino et al. | 379/389 |
| 4,555,596 | 11/1985 | Blomley | 379/388 |
| 4,715,062 | 12/1987 | Korsky et al. | 379/390 |
| 4,724,540 | 2/1988 | Pace et al. | 379/390 |
| 4,879,745 | 11/1989 | Arbel | 379/389 |
| 5,357,567 | 10/1994 | Barron et al. | 379/389 |
| 5,398,281 | 3/1995 | Kurokawa et al. | 379/390 |
| 5,416,416 | 5/1995 | Bisher | 324/426 |
| 5,430,796 | 7/1995 | Komoda et al. | 379/390 |
| 5,471,528 | 11/1995 | Reesor | 379/390 |
| 5,544,242 | 8/1996 | Robinson | 379/388 |

OTHER PUBLICATIONS

Motorola Semiconductor Technical Data for MC34118, entitled Voice Switched Speakerphone Circuit, pp. 2–365 to 2–384, Motorola, Inc., USA, 1989.

*Primary Examiner*—Krista M. Zele
*Assistant Examiner*—Jacques M. Saint-Surin
*Attorney, Agent, or Firm*—Frishauf, Holtz, Goodman, Langer & Chick

[57] ABSTRACT

A speakerphone which employs non-linear amplifiers to compress transmit and receive signals, and level detectors to determine levels of the compressed transmit and receive signals. Compressed transmit and receive signal levels are compared against one another by a comparator with hysteresis, to enable one of two speakerphone modes of operation—either a transmit mode or a receive mode. Fixed attenuators are switched into either the receive signal path or into the transmit signal path, depending upon the current speakerphone mode. The speakerphone functions described herein are readily implemented using inexpensive control circuitry and a standard telephone line interface, which can be shared by a telephone handset and other components of an integrated telephone system.

25 Claims, 4 Drawing Sheets

CHARACTERISTIC OF LOGARITHMIC FUNCTIONS
f(x)=LOG(x) AND y(x)=LOG[LOG(x)]

SPEAKERPHONE CONTROLLED BY A COMPARATOR WITH HYSTERESIS

TECHNICAL FIELD OF THE INVENTION

The invention relates to telephone communication systems, more particularly to telephone terminal devices for connecting to a switched telephone network, and specifically to speakerphone devices and systems and method of operation thereof.

BACKGROUND OF THE INVENTION

"Speakerphones" are telephone terminal devices which permit a user (local party) to converse over a telephone network with a distant party (called or calling party) without the use of a handset. Such use of a telephone is sometimes referred to as "hands-free" operation. Speakerphones incorporate a loudspeaker and a microphone, much as a handset incorporates a loudspeaker and a microphone in an earpiece and mouthpiece respectively. In the case of a speakerphone device, however, the loudspeaker and microphone are positioned so that they need not be held by the user. The loudspeaker is designed to produce an audio level sufficient to be heard by the user at some distance from the speakerphone device, and the microphone is designed to produce sufficiently large electrical signals on the telephone line even when the user talks at some distance from the speakerphone device. Hereinafter, the portion of the speakerphone which transmits electrical signals from the microphone to the telephone network will be referred to as the "transmit channel," and the portion of the speakerphone which converts electrical signals from the telephone network into audible sound to the loudspeaker will be referred to as the "receive channel."

Ideally, a speakerphone would allow a local party and a distant party to communicate over a telephone line simultaneously, i.e., both parties would hear each other when both are speaking, much as they would experience in using a telephone handset. This communication mode, where both parties can talk (transmit) and hear (receive) simultaneously, is known as "full-duplex." Because the telephone network carries both the transmit and receive signals in the same two-wire channel, full-duplex communication generally introduces a "sidetone" signal in the receive channel. "Sidetone" is the effect that results when the transmit signals are amplified by the receive channel and sent to the loudspeaker. In a telephone handset, a small amount of sidetone is desirable to compensate for the loss of voice acoustic feedback that the user experiences due to the presence of the earpiece very close (e.g., less than one inch) to the ear. In a speakerphone system, however, the sidetone is amplified at the loudspeaker and then coupled acoustically back to the microphone. This condition effectively results in a positive feedback loop with high gain that causes audible oscillations at the loudspeaker, an undesirable phenomenon referred to as "howling." Acoustic coupling from the loudspeaker to the microphone of a speakerphone can also cause an "echo" effect to the distant party because the signal received at the loudspeaker from the telephone line is transmitted by the microphone back to the line with high gain. These effects do not occur in telephone handset operation because the gains of the transmit and receive channels are substantially lower and acoustic coupling is obstructed by the user's ear being very close to the earpiece.

A low-cost sidetone cancellation circuit can reduce the sidetone significantly to suit the requirements of a telephone handset, but cannot suppress the sidetone sufficiently to allow full-duplex operation of a speakerphone. Adequate sidetone cancellation for such type of operation would require expensive filters that adapt to the impedance of the telephone line where the speakerphone device operates. Even more complex filters would be necessary to suppress the acoustic feedback from the loudspeaker to the microphone, by adapting to the acoustic environment where the speakerphone device operates.

In a more simplistic approach, the effects of acoustic feedback and sidetone can be prevented by "activating" or "enabling" only one channel at any one time, either the transmit or the receive channel. For example, when the receive channel is active, the telephone line signal is normally amplified at the loudspeaker while the gain of the transmit channel is decreased sufficiently to prevent howling (the transmit channel is effectively "inactive"). Conversely, when the transmit channel is active, the microphone signal is normally transmitted to the line while the gain of the receive channel is decreased (the receive channel is inactive). Such a process implies the existence of at least two operation states or "modes," and requires a circuit to decide at what end (local or distant party) a signal is originating so that the corresponding channel (transmit or receive) can be activated or "switched." This "switching" type of speakerphone operation is referred to as "half-duplex" and will be the subject of the discussion that follows.

Hereinafter, to simplify notation with respect to speakerphone mode switching, the mode normally associated with speech by the local party, in which the gain from microphone to telephone line is at maximum and the gain from telephone line to loudspeaker at minimum, will be called "transmit mode" or "TX"; and the mode normally associated with speech by the distant party, in which the gain from telephone line to loudspeaker is at maximum and the gain from microphone to telephone line at minimum, will be called "receive mode" or "RX."

Typically, a speakerphone device determines when to switch from transmit mode to receive mode and vice versa by means of a "decision circuit," usually a form of signal comparator that determines which operation mode to select (i.e., TX or RX). By comparing in magnitude two signals, intercepted from the transmit channel and the receive channel and representing a local party and a distant party, respectively, the decision circuit determines which mode, TX or RX, should be enabled.

An important factor that can compromise the operation of the decision circuit occurs when the transmit and receive signals are very similar in magnitude (for example, when both the local and distant parties are silent). Under this condition, the decision circuit will detect virtually the same input signals and it will randomly switch modes (TX to RX and vice versa) due to the presence of low-level noise in either input signal. The outcome is a rapid "switching oscillation" between TX and RX, that results in an undesirable switching noise.

To prevent switching oscillation, some form of "hysteresis" must be added to the decision circuit of a speakerphone. Hysteresis introduces a "signal bias" to the active channel so that the speakerphone mode associated with that channel persists when the input signals to the decision circuit are similar in magnitude. To switch mode, the signal of the inactive channel has to exceed in magnitude the signal of the active channel by the amount of hysteresis. The hysteresis, however, should not be so excessive as to interfere with a smooth switching operation of the speakerphone. For example, excessive hysteresis may force the decision circuit to remain in one state, either TX or RX, regardless of the signal levels present in the transmit and receive channels.

The speed at which the speakerphone switches from one mode to the other is critical. If the switching mechanism is slow, the beginning of transmitted or received audio signals on the speakerphone are briefly cut off and a disturbing "chopping" effect of audio signals results. Generally this effect can be compounded further by the wide dynamic range of the transmit and receive signals, typically in the order of 20 dB and 40 dB for the microphone and the telephone line, respectively.

Numerous speakerphone designs are known in the art. One speakerphone system is described in U.S. Pat. No. 4,513,177 (hereinafter, "NISHINO"). NISHINO addresses the problem of howling by using digital variable attenuators in the transmit and the receive channels. Using an analog-to-digital (A/D) converter to measure the signals in the transmit and receive channels, a control circuit calculates the amount of sidetone and acoustic feedback of the system. When these quantities are determined, the control circuit adjusts the attenuators so that the total loop gain of the system, microphone-to-line, line-to-loudspeaker, and loudspeaker-to-microphone, is less than unity (a gain greater than unity will generate howling).

A major shortcoming of the NISHINO technique is the complexity of the system. Expensive variable attenuators and a complex control circuit capable of making the gain calculations quickly and accurately are required in order to realize the technique. Further, the use of an A/D converter to sample the transmit and the receive signals adds considerable cost to the system.

U.S. Pat. No. 4,555,596 (hereinafter, "BLOMLEY") describes a speakerphone that, in a manner similar to NISHINO, uses digital variable attenuators for the transmit and the receive channels and two A/D converters in the decision circuit. To address the switching oscillation problem, a control circuit can introduce a delay in the switching of speakerphone modes.

BLOMLEY's system is expensive and prone to malfunction. A technique to account for the wide dynamic range of signals on the microphone and the telephone line is not disclosed. Simply adding resolution to the A/D converters to increase the dynamic range of the decision circuit would be very costly because the complexity of an A/D converter increases significantly with each added bit of resolution. Further, the delay introduced in the mode switching mechanism of the control circuit to avoid switching oscillation of the speakerphone can potentially cause chopping of audio signals.

One well known speakerphone device is the MC34118 integrated circuit manufactured by Motorola, Inc. The MC34118 implements half-duplex operation using three stable states. When the local party is talking, the circuit goes into a TX (transmit) state; when the distant party is talking, the circuit goes into an RX (receive) state. When neither party is talking, even during short pauses between speech, the circuit goes into an IDLE state. The gain transition from one channel to the other is continuous and must pass through the IDLE state. The gain in one channel is gradually increased as the gain in the other channel is decreased, and the IDLE state occurs approximately halfway between the TX and RX states, when both the transmit and receive channel gains are partially attenuated.

The approach used in the Motorola MC34118 is attractive in principle, but has two major drawbacks. First, the analog circuitry required to implement a continuous transition from one state to the other is unnecessary and expensive. A transition between two states must take place in a short time, typically less than 10 milliseconds (ms), to assure that the speakerphone users do not perceive a delay in switching. Accordingly, it is impossible for the users to distinguish a transition between states that is "gradual" from a transition that is "discontinuous" (i.e., one where the transmit channel gain and the receive channel gain are switched instantaneously between two preset values, when modes are switched). The users will be unable to appreciate a gradual transition between states that occurs in a 10 ms period, and therefore the cost of the circuitry associated with that effect is not justified.

Second, if a party pauses between sentences or words, the speakerphone system will enter the IDLE state. This is undesirable because the partial attenuation introduced by the IDLE state to both the transmit and the receive channels would cause the listener to perceive a temporary interruption of the background noise associated with the acoustic environment of the other party, a phenomenon that emphasizes and directs attention to the half-duplex nature of the conversation. (In general, it is desired that the operation of a speakerphone be "transparent" to the users at both ends of the communication channel.)

Another prior-art speakerphone system is described in U.S. Pat. No. 3,725,585 (hereinafter, "MONIAK"). MONIAK describes a two-state (TX/RX) system which is relatively simpler than that employed in the Motorola MC34118, but still exhibits certain disadvantages. As in the MC34118, the attenuation in the transmit channel and the receive channel is implemented using variable gain amplifiers which add cost without improving performance. More importantly, MONIAK's system architecture can cause undesirable switching, as described below.

Using a technique well known in the art, MONIAK employs two logarithmic amplifiers in the front-end of the decision circuit, one for the transmit channel and the other for the receive channel, that compress the wide dynamic range of the microphone and telephone line signals, respectively. To prevent switching oscillation, MONIAK introduces hysteresis by injecting two signals into each logarithmic amplifier: one from the microphone (for the transmit channel) or telephone line (for the receive channel), and the other from the output of the respective variable gain amplifiers. If TX is enabled, for example, the transmit logarithmic amplifier will receive one signal from the microphone and one signal from the output of the transmit variable gain amplifier, whereas the receive logarithmic amplifier will receive effectively only one signal from the telephone line (in TX mode, the output of the receive variable gain amplifier is attenuated by approximately 70 dB and therefore can be neglected). The additional signal present in the transmit logarithmic amplifier introduces the desired hysteresis and prevents switching oscillation. The same is true for the receive logarithmic amplifier when the circuit switches to RX.

One drawback of this design approach is that the gains of the logarithmic amplifiers effectively change when the system switches from TX to RX and vice versa. The logarithmic stage of a channel has more gain if the channel is active than if the same channel is inactive, and therefore the dynamic range of the channel is dependent on the speakerphone state. (The gain of the logarithmic stage should be determined only by the dynamic range of the input signals and should be fixed once such range is known.)

A more fundamental problem associated with the MONIAK approach is that the amount of hysteresis added to the system is a function of signal levels. With low signal levels, the hysteresis almost disappears and switching oscillation occurs (despite the attempt to eliminate it). The system must rely on the presence of background noise to maintain a minimum value of hysteresis. With large signal levels, the amount of hysteresis becomes excessive. This gives an unfair advantage to the active channel and makes it increasingly difficult for the inactive channel to become active and "break in" during a conversation. (This effect is informally called the "monologue syndrome.")

Evidently, there is a need for a speakerphone design which addresses the aforementioned problems of howling, switching oscillation, and chopping of audio signals in a cost-effective manner, while overcoming the drawbacks of the prior-art techniques.

SUMMARY OF THE INVENTION

It is therefore a general object of the present invention to provide an improved speakerphone system.

It is a further object of the present invention to provide a technique for preventing howling in a speakerphone.

It is a further object of the present invention to provide a technique which prevents switching oscillation between a transmit mode and a receive mode in a speakerphone.

It is a further object of the present invention to accomplish the foregoing objects in a manner which minimizes chopping of audio signals.

It is a further object of the present invention to provide techniques for accomplishing the foregoing objects at low-cost.

It is a further object of the present invention to provide techniques for accomplishing the foregoing objects while providing sensitivity to transmit signals and receive signals over a wide dynamic range.

It is a further object of the present invention to provide a speakerphone design which employs a simple and easily adjustable hysteresis technique.

It is a further object of the present invention to provide techniques for accomplishing the foregoing objects which permit sharing of functional parts with a standard telephone device.

The present invention describes a simple two-state speakerphone system. A mode-determining decision circuit controls the two-state mode switching by selecting either a transmit mode or a receive mode. Switching oscillation is prevented by introducing a specified amount of hysteresis in the mode-determining process.

According to the invention, a standard telephone line interface with sidetone cancellation is employed to provide separate receive and transmit signals from/to a telephone line. At least some cancellation of the transmit signal in the receive signal is accomplished by the sidetone cancellation. The receive signal is amplified by a receive amplifier for reproduction to a main loudspeaker, and a main microphone signal is amplified by a transmit amplifier for transmission over the telephone line.

According to an aspect of the invention, a standard telephone handset can be added to the system to permit "normal" handset operation. When the speakerphone is inactive, the receive and transmit amplifiers provide an interface between a standard telephone handset and the telephone line. Switches are provided to select between speakerphone function and handset function.

In "handsfree" speakerphone operation, switchable fixed attenuators are inserted in the receive channel and transmit channel so that, subject to the state of a speakerphone mode control signal, attenuation can be applied to either the transmit signal or the receive signal. (Attenuation is not employed with the telephone handset.)

A first non-linear amplifier compresses the dynamic range of the receive signal and provides the compressed receive signal to a first level detector which determines the level of the compressed receive signal.

A second non-linear amplifier compresses the dynamic range of the transmit signal and provides the compressed transmit signal to a second level detector which determines the level of the compressed transmit signal.

A comparator with fixed hysteresis is employed to compare the detected levels of the receive signal and the transmit signal. The result of the comparison provides the speakerphone mode control signal.

According to an aspect of the invention, the non-linear amplifiers are logarithmic amplifiers.

According to another aspect of the invention, the non-linear amplifiers are cascaded logarithmic amplifiers which provide a log[log(x)] response.

According to another aspect of the invention, the level detectors are peak detectors.

According to another aspect of the invention, the switchable attenuation is provided by an attenuator comprising a parallel combination of a switch and a resistor. The attenuation is provided by the resistor when the switch is opened (the attenuator is in the "off" state), whereas the resistor is "bypassed" and no attenuation is provided when the switch is closed (the attenuator is in the "on" state). There are no intermediate states between the "on" and "off" states in the attenuator.

According to another aspect of the invention, the switchable attenuation is provided by any suitable two-state, fixed attenuator comprising, for example two switches in series with respective resistors. The attenuation is provided by a first resistor when the respective first switch is closed, and no attenuation is provided by a second resistor when the respective second switch is closed.

According to another aspect of the invention, the switch (es) can be either mechanical (e.g., relay) or electronic (e.g., analog switch).

It is generally desirable that a half-duplex speakerphone should satisfy three requirements:

1. if only one party talks, no mode switching should occur during pauses;
2. if one party talks, the other party must be able to break in the conversation or interrupt; and
3. the mode switching (i.e., between TX mode and RX mode) must be fast.

The present invention employs a simple technique which satisfies these three requirements using inexpensive, standard parts, which can be shared by a telephone handset or answering machine to further reduce the cost of an integrated telephone system.

Other objects, features, and advantages of the present inventions will become evident in light of the following description thereof.

BRIEF DESCRIPTION OF THE DRAWINGS

Reference will be made to preferred embodiments of the invention, examples of which are illustrated in the accompanying drawings. Although the invention will be described in the context of these preferred embodiments, it should be understood that it is not intended to limit the spirit and scope of the invention to these particular embodiments.

DETAILED DESCRIPTION OF THE INVENTION

Figure 1:
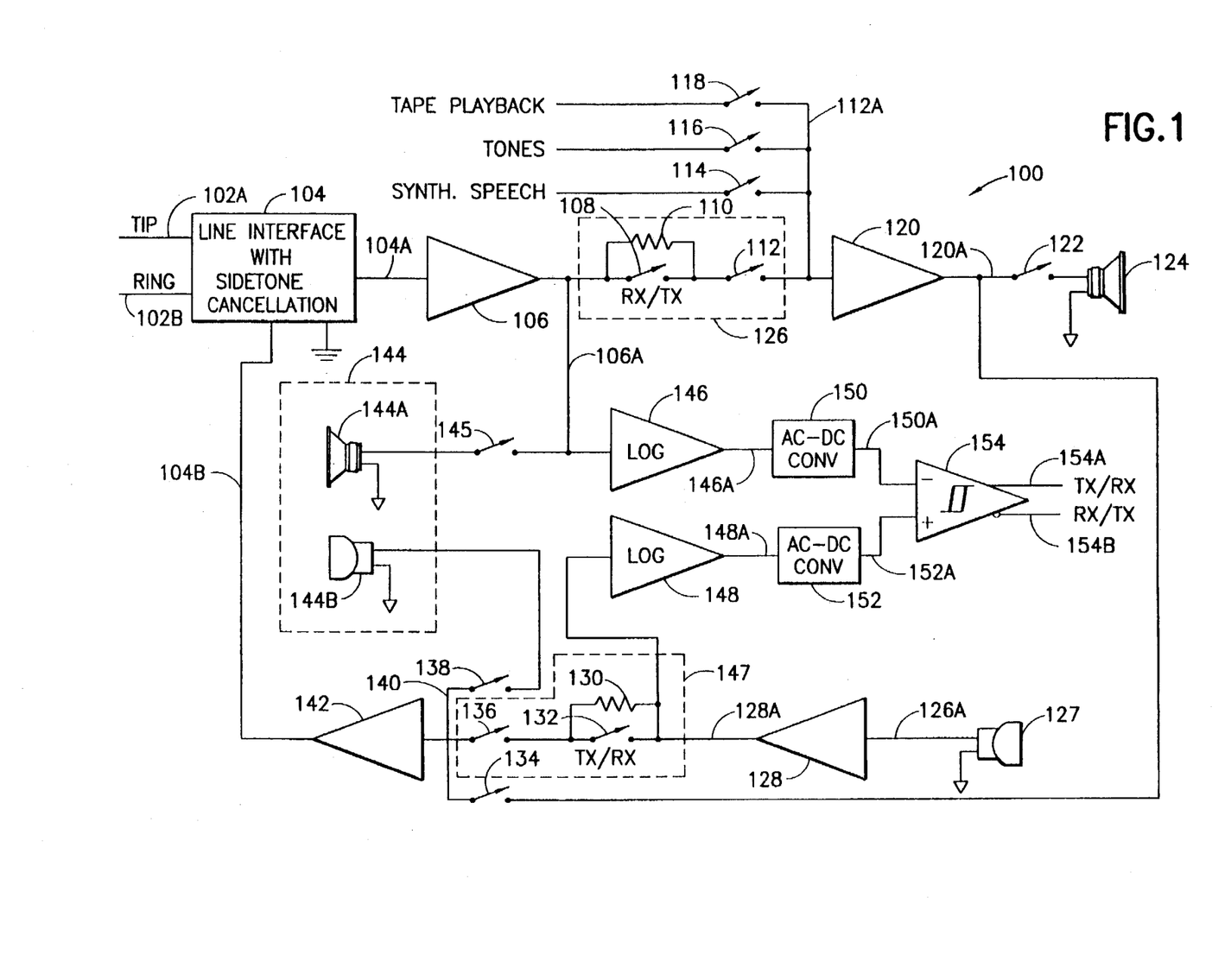
FIG. 1 is a block diagram of a speakerphone according to the present invention.

FIG. 1 is a block diagram of a speakerphone 100, according to the present invention. The speakerphone 100 is intended for use both as a "hands-free" speakerphone and as a "normal" telephone terminal device. Accordingly, the speakerphone 100 includes a loudspeaker 124 and a microphone 127 for "hands-free" operation, and a "normal" handset 144, which includes a handset loudspeaker 144A and a handset microphone 144B.

A connection to a telephone line is accomplished via a "tip" line 102A and a "ring" line 102B. (The names "tip" and "ring" derive from their respective connections to a tip portion and a ring portion, respectively, of a standard "phone plug" which was used to make telephone connections in manual switchboards.) Signals on the telephone line are composite signals which contain both transmit and receive components. A conventional line interface 104 (which conventionally includes a sidetone cancellation circuit) separates the receive and transmit components of the signals, providing a separate receive signal 104A and transmit signal 104B. The line interface 104 provides sidetone cancellation whereby much of the transmit signal 104B which appears in the composite signal on the telephone line is eliminated from the receive signal 104A. Sidetone cancellation, however, is not perfect, and there can be some leakage of the transmit signal 104B into the receive signal 104A.

The receive signal 104A is amplified by a receive preamplifier 106 to provide an amplified receive signal on a line 106A. The signal level of the amplified receive signal 106A is sufficient to drive the handset loudspeaker 144A. A switch 145 between the handset loudspeaker 144A and the amplified receive signal 106A permits sound from the handset loudspeaker 144A to be cut off by opening the switch 145. If a single-chip telephone interface integrated circuit (a "speech network" device) is employed to interface to the telephone line, the preamplifier 106 may be substituted by the receive stage of the speech network device rather than being provided as a separate component.

The amplified receive signal 106A is connected to a receive summing amplifier 120 through an attenuator 126, which controls the attenuation of the receive channel of the speakerphone. The attenuator comprises a parallel combination of a switch 108 and a resistor 110, in series with a selector switch 112. In speakerphone operation the switch 112 is closed, and the switch 108 permits selection of a low or high impedance in series with the receive summing amplifier 120, when the switch 108 is closed or opened, respectively. Three additional selector switches 114, 116, and 118 permit the connection of one or more signal sources to the receive summing amplifier 120. When switch 114 is closed, synthesized speech (e.g., from an announcing device) is selected. When switch 116 is closed, tones (e.g., dialing and/or signalling tones) are selected. When switch 118 is closed, a tape playback signal (e.g., from a telephone answering device) is selected. The receive summing amplifier 120 directs the selected signals into a combined source signal on a line 120A. A loudspeaker switch 122 connects the combined source signal 120A to the loudspeaker 124. When the loudspeaker switch 122 is closed, the selected signals are made audible by the loudspeaker 124.

The amplified receive signal (on line 106A) is also connected to an input of a first logarithmic amplifier 146. The logarithmic amplifier 146 effectively "compresses" the amplified receive signal non-linearly such that lower signal levels are enhanced while higher signal levels are attenuated. The first logarithmic amplifier 146 provides a compressed receive signal on a line 146A (at an output thereof). The compressed receive signal 146A is processed by a first AC-to-DC conversion circuit 150 to provide a receive level signal on a line 150A, which is proportional to the amplitude of the compressed receive signal 146A.

The microphone 127 provides a microphone signal on a line 126A which is amplified by a microphone preamplifier 128 to provide an amplified microphone signal on a line 128A. In much the same manner as the amplified receive signal on the line 106A was treated, the amplified microphone signal 128A is connected to a transmit summing amplifier 142 through an attenuator 127 which controls the attentuation of the transmit channel of the speakerphone. The attenuator 127 comprises a parallel combination of a switch 132 and a resistor 130, in series with a selector switch 136. In speakerphone operation the switch 136 is closed, and the switch 130 permits selection of a low or a high impedance in series with the transmit summing amplifier 142, when the switch 130 is closed or opened, respectively. Two additional selector switches, 134 and 138, permit the connection of the combined source signal 120A and a signal from the handset microphone 144B, respectively, to the transmit summing amplifier 142. The combined source signal 120A carries one or more alternate signal sources, e.g., tape playback, tones, synthesized speech, etc., selected by closing switches 118, 116, and 114, respectively. The transmit summing amplifier 142 directs the selected signals to a transmit signal on a line 104B for transmission over the telephone line. If an integrated "speech network" device is employed to interface to the telephone line, the transmit summing amplifier 142 may be substituted by such a telephone interface circuit rather than being provided as a separate component.

The amplified microphone signal 128A is also connected to an input of a second logarithmic amplifier 148, which compresses the dynamic range of the amplified microphone signal 128A and provides a compressed microphone signal on a line 148A (at an output thereof). The compressed microphone signal 148A is processed by a second AC-to-DC conversion circuit 152 to provide a microphone level signal on a line 152A which is proportional to the amplitude of the compressed microphone signal 148A.

A comparator 154 having hysteresis is used to compare the receive level signal 150A with the microphone level signal 152A, and provides comparison outputs on lines 154A (TX/RX) and 154B (RX/TX). The comparison outputs 154A and 154B are opposite in polarity to one another. The comparison output 154A is used to control closure of the switch 132, while the comparison output 154B is used to control closure of the switch 108, such that when switch 132 is closed, switch 108 is opened and vice-versa. (In effect, this means that when the receive channel is attenuated, the transmit channel is unattenuated, and vice-versa.)

By compressing the amplified receive signal 106A and the amplified microphone signal 128A, the logarithmic amplifiers 146 and 148 minimize distinctions between "loud" signals and "soft" signals, effectively increasing the dynamic range over which the comparator 154 will function adequately. When the amplified microphone signal 128A is larger than the amplified receive signal 106A, the TX/RX output 154A of the comparator 154 becomes asserted and the RX/TX output 154B of the comparator becomes un-asserted, closing switch 132 and opening switch 108. This sets the speakerphone into "transmit mode" wherein the amplified microphone signal 128A is unattenuated in its connection to the summing transmit amplifier 142 (driving the telephone line), and the amplified receive signal 106A is attenuated in its connection to the amplifier 120 (driving the loudspeaker 124). Conversely, when the amplified receive signal 106A is louder than the amplified microphone signal 128A, the TX/RX output 154A of the comparator 154 becomes un-asserted and the RX/TX output 154B becomes asserted, opening switch 132 and closing switch 108. This sets the speakerphone into "receive mode" wherein the receive signal presented to the loudspeaker 124 is unattenuated, while the microphone signal transmitted to the telephone line is attenuated. This is the mechanism by which transmit/receive mode switching occurs in the speakerphone of the present invention.

It is within the scope of this invention that the aforementioned logarithmic amplification is one of many different possible kinds of signal compression that could be employed, and that any suitable means of signal compression can be substituted therefor.

It is also within the scope of this invention that the "switches" (e.g., 108, 112, 114, 116, 118, 132, 134, 136, 138, 145) described hereinabove can be either mechanical or electronic.

The various selector switches 112, 114, 116, 118, 122, 134, 136, 138, and 145 are used to control the function of the speakerphone. In general, to effect "hands-free" speakerphone operation, switches 112, 122 and 136 are closed, and switches 145 and 138 are opened. To effect "normal" handset operation, switches 145 and 138 are closed and switches 112, 122, and 136 are opened. In normal operation, switches 112 and 134 would not be closed at the same time.

Figure 2A:
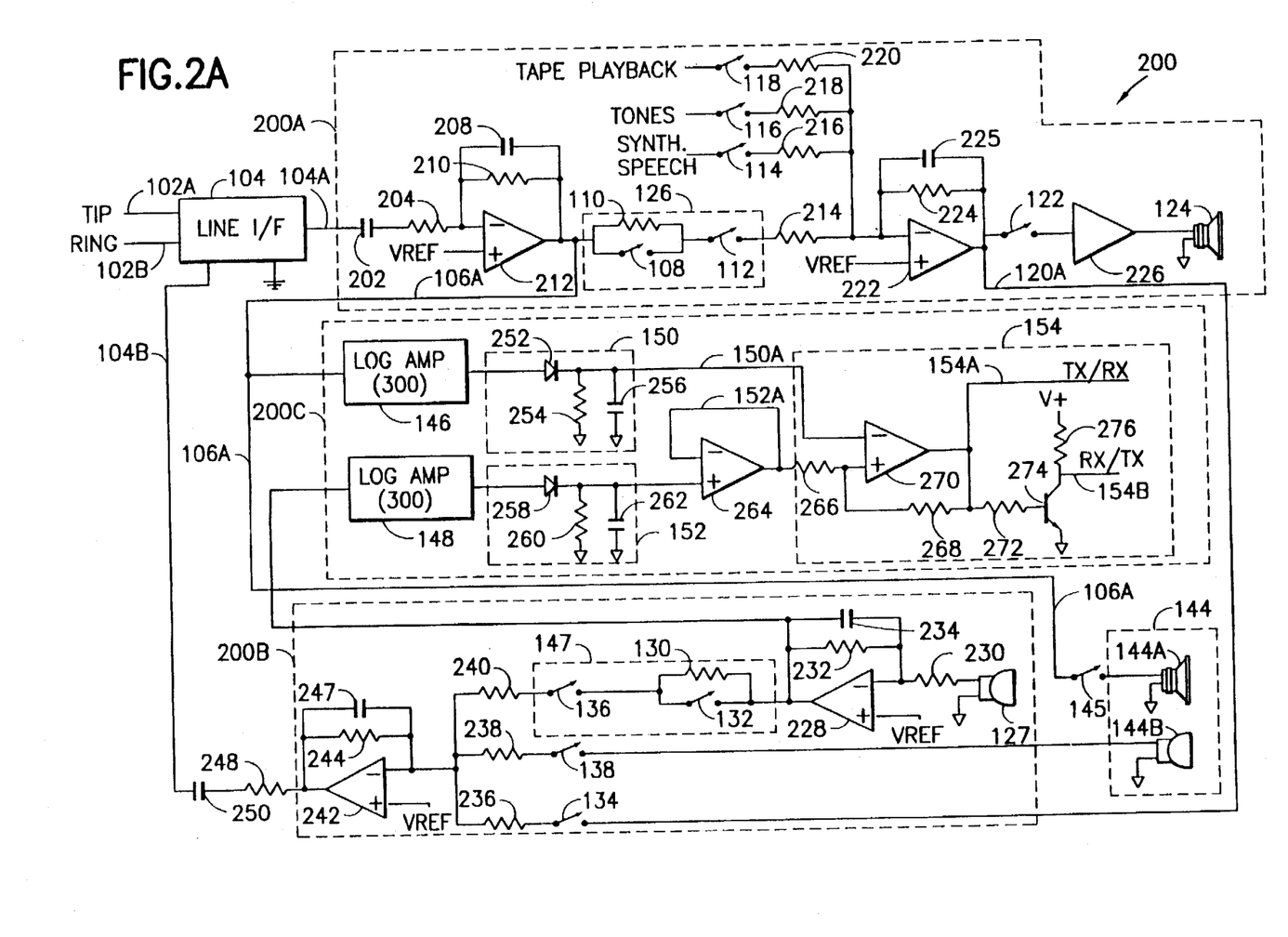
FIG. 2A is a schematic diagram of an embodiment of the speakerphone of FIG. 1, according to the present invention.

FIG. 2A is a schematic speakerphone of an embodiment 200 of the speakerphone of FIG. 1. As shown in FIG. 2A, the speakerphone design comprises three main blocks: a receive block (indicated by dashed box 200A), a transmit block (indicated by dashed box 200B), and a decision circuit (indicated by dashed box 200C).

The receive block 200A includes a receive preamplifier (amplifier 212, resistors 204 and 210, and capacitors 202 and 208), a receive attenuator (the switch 108 and attenuator resistor 110, in series with the switch 112), a receive summing amplifier (amplifier 222, input resistors 214, 216, 218, 220, feedback resistor 224 and capacitor 225), the loudspeaker switch 122, a loudspeaker driver amplifier 226, and the loudspeaker 124, connected to one another as shown in FIG. 2A.

The receive signal 104A is AC-coupled via the capacitor 202 and the resistor 204 to a negative ("–") input of the receive preamplifier 212 (compare 106, FIG. 1). Negative feedback in the preamplifier is provided by the resistor 210 and the capacitor 208. The gain of the preamplifier is set by the ratio of the values of resistors 210 and 204, while the frequency response is controlled by capacitors 202 and 208 (for low and high frequencies, respectively).

The receive summing amplifier 222 (see 120, FIG. 1) has input resistors 214, 216, 218, and 220 connected to the selector switches 112, 114, 116, and 118, respectively. The resistors 214, 216, 218, and 220 join at a summing junction formed at the negative input of the amplifier 222. Negative feedback in the summing amplifier is provided by the resistor 224 and the capacitor 225. For each signal selected by switches 112, 114, 116 and 118, the gain of the summing amplifier is set by the ratio of the value of the feedback resistor 224 to the values of the input resistors 214, 216, 218, and 220, respectively, while the high-frequency response is controlled by capacitor 225. The loudspeaker driver amplifier 226 is connected between the loudspeaker 124 and the loudspeaker switch 122.

In "handsfree" speakerphone operation, switches 112 and 122 are both closed. When the switch 108 is opened, the resistor 110 is switched in series with resistor 214 and the input resistance to the receive summing amplifier 222 is increased, thereby reducing the gain of the summing amplifier and attenuating the signal received at the loudspeaker 124. The value of resistor 110, generally much larger than the value of resistor 214, determines the amount of such attenuation.

Figure 3A:
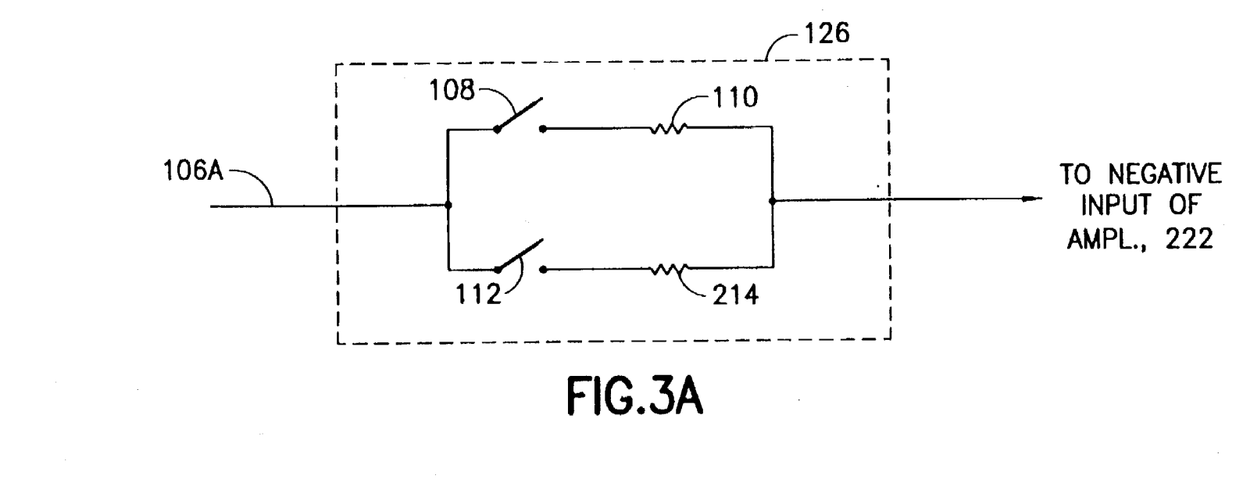
FIG. 3A is a schematic diagram of an alternative two-state, fixed attenuator portion of the speakerphone, according to the present invention.

Alternatively, the attenuator 126 and the resistor 214 can be configured as shown in FIG. 3A. Switch 108 is in series with resistor 110, and switch 112 is in series with resistor 214. The two series connections of resistors 110 and 214 and their respective switches 108 and 112 are connected in parallel to the negative input of the receive summing amplifier 222. When switch 112 is opened, the switch 108 is closed and resistor 110 provides attenuation in the summing amplifier; when switch 108 is opened, the switch 112 is closed and resistor 214 provides gain in the summing amplifier. (In handset operation, switches 108 and 112 are both open.).

The transmit block 200B includes the microphone 127, a microphone preamplifier (amplifier 228, resistors 230 and 232, and capacitor 234; compare 128, FIG. 1), a transmit attenuator (the switch 132 and attenuator resistor 130, in series with the switch 136), the selector switches 134 and 138, and a transmit summing amplifier (amplifier 242, input resistors 236, 238, 240, feedback resistor 244 and capacitor 247; compare 142, FIG. 1).

Signals from the microphone 127 are coupled via resistor 230 to the negative input of the microphone preamplifier 228. Negative feedback in the preamplifier is provided by the resistor 232 and the capacitor 234. The gain of the preamplifier is set by the ratio of the values of resistors 232 and 230, while the high-frequency response is controlled by capacitor 234.

The transmit summing amplifier (compare 142, FIG. 1) has input resistors 236, 238, and 240 connected to the selector switches 134, 138, and 136, respectively. The resistors 236, 238, and 240 join at a summing junction formed at a negative input of the amplifier 242. Feedback in the amplifier 242 is provided by the resistor 244 and the capacitor 247. For each input selected by switches 134, 138, and 136, the gain of the summing amplifier is set by the ratio of the value of the feedback resistor 244 to the values of the input resistors 236, 238, and 240, respectively, while the high-frequency response is controlled by capacitor 247.

In "handsfree" speakerphone operation, switch 136 is closed and the attenuator 127 controls the attenuation of the transmit channel. When the switch 132 is opened, the resistor 130 is switched in series with resistor 240 and the input resistance to the transmit summing amplifier 242 is increased, thereby reducing the gain of the summing amplifier and attenuating the signal transmitted to the telephone line. The value of resistor 130, generally much larger than the value of resistor 240, determines the amount of such attenuation.

Figure 3B:
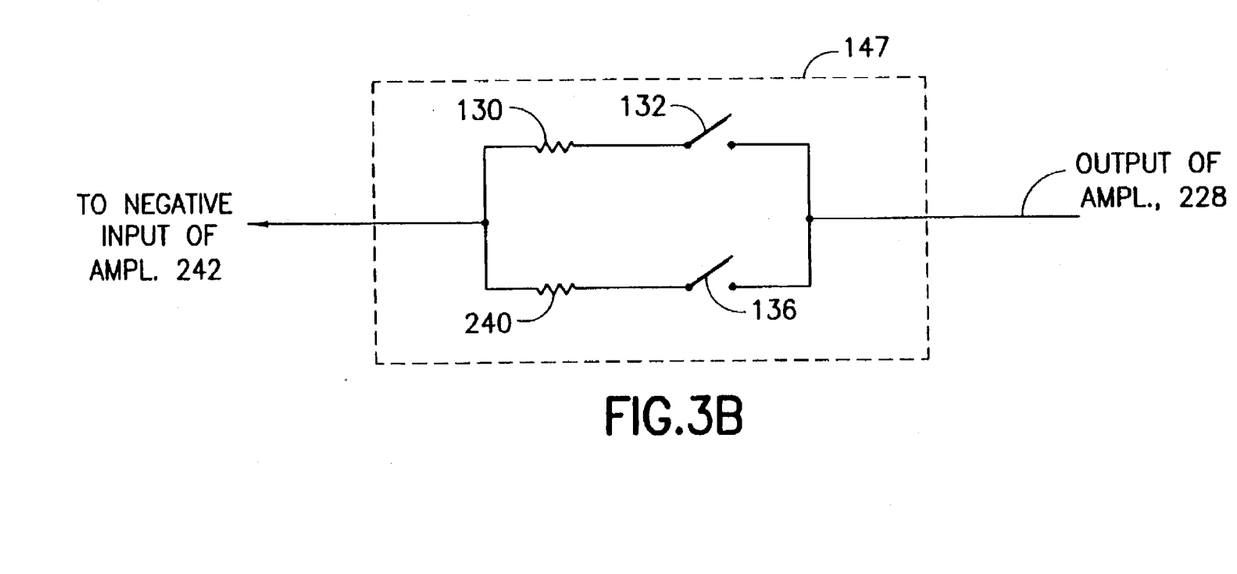
FIG. 3B is a schematic diagram of another alternative two-state, fixed attenuator portion of the speakerphone, according to the present invention.

Alternatively, the attenuator 127 and the resistor 240 can be configured as shown in FIG. 3B. Switch 132 is in series with resistor 130, and switch 136 is in series with resistor 240. The two series connections of resistors 130 and 240 and their respective switches 132 and 136 are connected in parallel to the negative input of the transmit summing amplifier 242. When switch 136 is opened, the switch 132 is closed and resistor 130 provides attenuation in the summing amplifier; when switch 132 is opened, the switch 136 is closed and resistor 240 provides gain in the summing amplifier. (In handset operation, switches 132 and 136 are both open.)

The decision block 200C includes the two logarithmic amplifiers 146 and 148 (shown and described in greater detail hereinbelow with respect to FIG. 2B), the two AC-to-DC conversion circuits 150 and 152, a buffer amplifier 264, and the comparator with hysteresis 154. (See FIG. 1 for comparison with like-numbered items).

The AC-to-DC conversion circuit 150 is essentially a peak detector including a diode 252, a resistor 254, and a capacitor 256, connected as shown in FIG. 2A. The AC-to-DC conversion circuit 152 is identical to the circuit 150, and includes a diode 258, a resistor 260 and a capacitor 262. Such peak detector circuits are generally well known, and it is within the scope of this invention that any suitable peak detection circuit can be substituted for the peak detector circuits 150 and 152.

The comparator with hysteresis 154 includes a comparator 270, a feedback resistor 268, and an input resistor 266. The resistor 266 is connected to a positive ("+") input of the comparator 270, and the resistor 268 is connected to the comparator in a positive feedback configuration. The amount of hysteresis is set by the ratio of the values of resistors 268 and 266. In the present invention, the amount of hysteresis in the system should be about ±100 mV). The buffer amplifier 264 (external to the comparator 154) provides a low-impedance input to the comparator and prevents interaction between the components of the AC-to-DC conversion circuit 152 and the hysteresis resistors 266 and 268 of the comparator 154. The output of the AC-to-DC conversion circuit 150 connects to a negative input of the comparator 270, and the output of the AC-to-DC conversion circuit 152 connects to a positive input of the comparator 270 through the buffer amplifier 264 and the resistor 266. An output of the comparator 270 provides the TX/RX signal on a line 154A. A simple, one transistor invertor including an NPN transistor 274 and two resistors 272 and 276 inverts the TX/RX signal 154A to provide its logical complement, the RX/TX signal on the line 154B. As described hereinabove with respect to FIG. 1, these signals are used to control attenuation of the receive channel and the transmit channel for speakerphone operation.

Figure 2B:
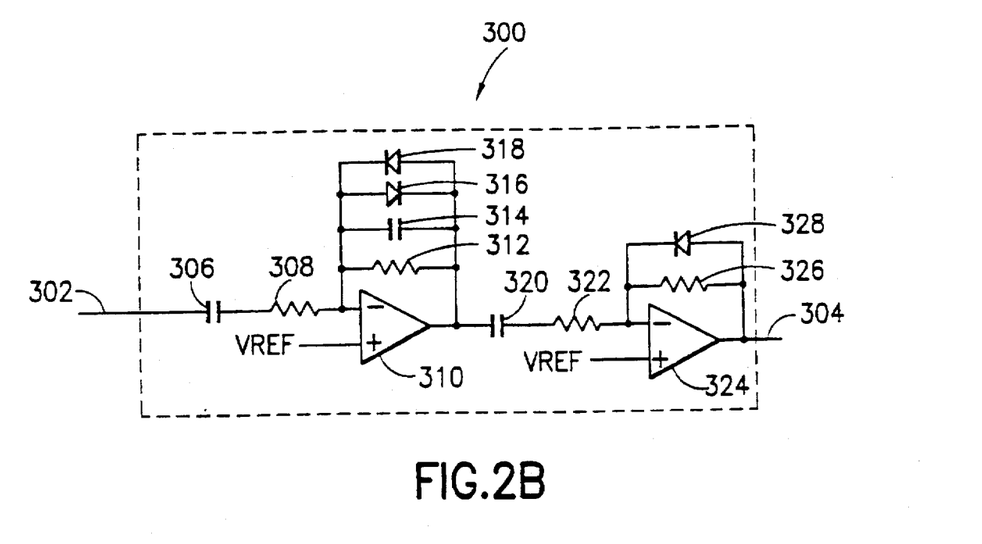
FIG. 2B is a schematic diagram of a logarithmic amplifier portion of the speakerphone according to the present invention.

FIG. 2B is a schematic diagram of the logarithmic amplifier portion 300 (see 146 and 148, FIGS. 1 and 2A) of the speakerphone, according to the present invention. The logarithmic amplifier 300 shown in FIG. 2B includes two (a first and a second) logarithmic amplifiers connected in series with one another to provide compression of an input signal on a line 302.

The first logarithmic amplifier includes an amplifier 310, an input capacitor 306 and an input resistor 308, a feedback resistor 312 and a feedback capacitor 314, and two diodes 316 and 318. The diodes 316 and 318 are connected to the amplifier 310 in a negative feedback configuration. The values of resistors 308 and 312 set the gain of amplifier 310, while the exponential current to forward-voltage characteristic of the diodes 316 and 318 provides a non-linear, logarithmic gain response The second logarithmic amplifier includes an amplifier 324, an input capacitor 320 and an input resistor 322, a feedback resistor 326 and a feedback diode 328. As with the first logarithmic amplifier, resistors 326 and 322 set the gain of the amplifier 324, while the exponential characteristic of the feedback diode provides a non-linear, logarithmic gain response. Only one diode 328 is employed in the second logarithmic amplifier because a subsequent AC-to-DC conversion (see, e.g., 150 or 152 of FIG. 2A) detects only positive going peaks of the logarithmic amplifier 300 output signal on a line 304 (compare line 150A of FIG. 2A). Accordingly, logarithmic non-linearity need only be applied to positive going excursions of the output signal 304 in the second logarithmic amplifier.

High-frequency response of the logarithmic amplifier 300 is controlled (dominated) by the capacitor 314, while low-frequency response is controlled by the capacitors 306 and 320. Additionally, capacitors 306 and 320 eliminate any undesirable DC offsets in the amplifier.

By substituting the logarithmic amplifier 300 of FIG. 2B for the logarithmic amplifier blocks 146 and 148 shown in FIG. 2A, a full schematic for the speakerphone of FIG. 2A is realized.

It is within the scope of this invention that commercially available logarithmic amplifier IC's (integrated circuits) can be substituted for the logarithmic amplifier 300, and that any suitable signal compression function can be used to have much the same effect.

Figure 4:
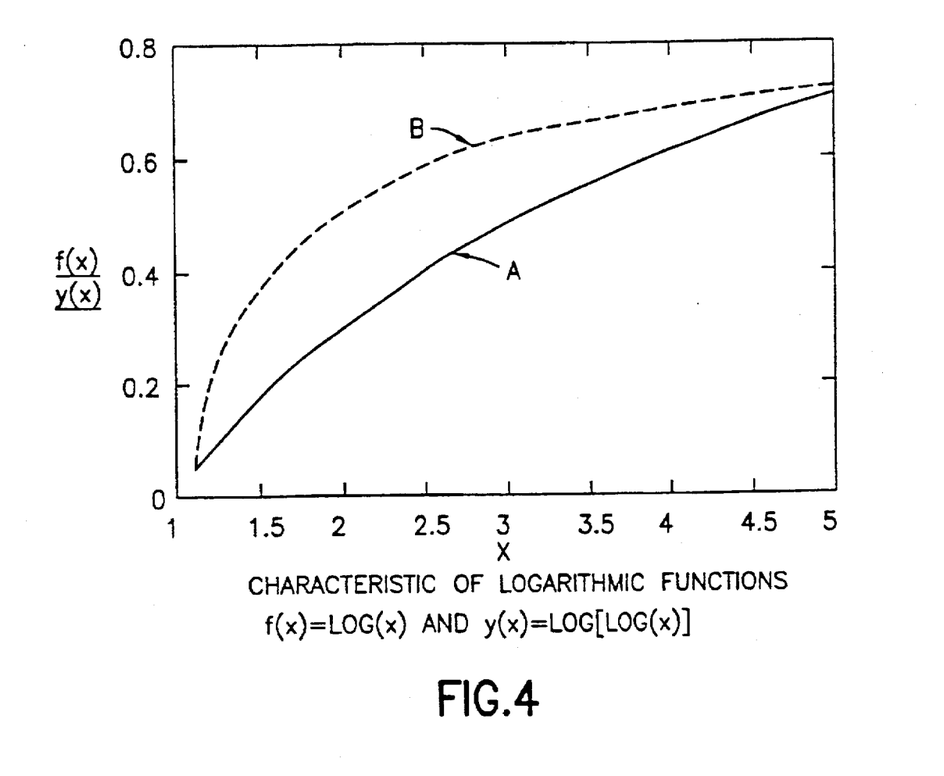
FIG. 4 is a graph illustrating single and series-dual logarithmic stages for use in the present invention.

The purpose of such logarithmic amplifiers (or other compressing circuits) is to compress the dynamic range of the incoming signals so that two levels of substantially different amplitude can be compared to one another. The combinations of two logarithmic amplifiers in series (see FIG. 2B) are used to make the output/input compression characteristic more non-linear (i.e., than it would be if using a single logarithmic amplifier). The characteristics of single and series-dual logarithmic stages are shown in FIG. 4. Curve A in FIG. 4 is a plot of the function $f(x)=\log(x)$, representing two single stage while curve B in FIG. 4 is a plot of the function $y(x)=\log[\log(x)]$, representing two single stages in series. The two plots have been scaled appropriately to facilitate a comparison. Function $y(x)$ B is considerably less linear than function $f(x)$ A, which implies that function $y(x)$ B provides more compression than function $f(x)$ A. The gains of logarithmic amplifiers 146 and 148 depend on the dynamic range of the incoming receive signal 104A and the microphone signal 126A, respectively, and are set to achieve the best possible switching over the entire range of input signals.

For "normal" handset operation, switches 112, 122, and 136 are opened and switches 138 and 145 are closed. In this condition, the loudspeaker 144A and the microphone 144B of the handset 144 are interfaced to the telephone line by the receive preamplifier 212 and the transmit summing amplifier 242, respectively. Adequate receive levels to the handset are provided by the receive preamplifier 212, while transmit levels to the telephone line are set by resistor 238.

Generally, in the present invention, the amount of hysteresis in the system should be in the order of about +/−100 mv. Other amounts of hysteresis could be used.

The speakerphone circuit described hereinabove overcomes the drawbacks of prior-art designs and offers excellent performance at very low cost.

Because the speakerphone operation is bi-stable (only two stable states are possible, TX or RX), the system is essentially simple and can be easily adjusted to achieve desirable performance. Moreover, if one party talks, even pausing between words or sentences, the speakerphone remains in the same state until the other party interrupts. This characteristic makes a speakerphone conversation sound more pleasant and natural because the acoustic environment of the active channel is not muted during pauses in speech.

Another advantage of the invention is that attenuation of the inactive channel is effectively achieved in a very inexpensive manner, simply by employing resistors (e.g., 110, 130) in parallel or in series with switches (e.g., 108, 132). The level of attenuation, controlled by the resistors, is chosen as to avoid howling in the system while providing, at the same time, enough gain to make the inactive channel audible to some extent. Since the acoustic transition from a partially muted to an active channel sounds less abrupt than a transition between a completely muted to an active channel, the switching is less noticeable.

The decision circuit is simple and allows fast switching between operation modes (TX and RX). The amount of hysteresis is essentially independent of the magnitude of the receive and transmit signals, and the gains of the logarithmic amplifiers are not affected by the speakerphone operation mode. The hysteresis is set by the ratio of the values of two resistors (i.e., 266, 268), while the gains of the logarithmic stages are determined and fixed independently of hysteresis according to the dynamic range of the input signals. This approach improves the switching quality of the speakerphone substantially over prior-art techniques.

The hardware components of the speakerphone are versatile, and can be shared with other elements of an integrated telephone system. Generally, a telephone answering device has a tape interface and requires alert tones and synthesized speech at both the speaker and the telephone line. This requirement is easily fulfilled by the hardware configuration of the speakerphone system described hereinabove. Tape playback signals, tones, and synthesized speech can be sent to the speaker or to the telephone line independently of speakerphone function. The speakerphone design described hereinabove provides a "framework" for virtually all the audio switching of a telephone system.

Although the invention has been illustrated and described in detail in the drawings and foregoing description, the same is to be considered as illustrative and not restrictive in character—it being understood that only preferred embodiments have been shown and described, and that all changes and modifications that come within the spirit of the invention as defined in the appended claims are desired to be protected.

What is claimed is:

1. A switching type, half duplex, speakerphone, comprising:

a telephone line interface for receiving a receive signal from a telephone line and transmitting a transmit signal to a telephone line, said telephone line interface including a sidetone cancellation circuit for eliminating a substantial portion of the transmit signal from the receive signal;

a receive amplifier for amplifying the receive signal;

a transmit amplifier for amplifying signals from a main microphone to provide the transmit signal;

a main loudspeaker for converting the receive signal to an audible signal;

a first non-linear amplifier for compressing the receive signal to provide a compressed receive signal;

a second non-linear amplifier for compressing the transmit signal to provide a compressed transmit signal;

a first level detector for detecting a level of the receive signal;

a second level detector for detecting a level of the transmit signal;

a comparator with hysteresis for comparing the level of the compressed receive signal with the level of the compressed transmit signal, and providing a comparison output;

a first signal attenuator responsive to a first state of the comparison output to attenuate the receive signal; and a second signal attenuator, responsive to a second state of the comparison output to attenuate the transmit signal;

whereby, when the receive signal is attenuated the transmit signal is unattenuated, and vice-versa.

2. A speakerphone according to claim 1 wherein:

the first non-linear amplifier and the second non-linear amplifier each comprise a logarithmic amplifier unit.

3. A speakerphone according to claim 1, wherein:

the first non-linear amplifier and the second non-linear amplifier each comprise a pair of series connected logarithmic amplifiers.

4. A speakerphone according to claim 1, wherein:

the first level detector and second level detector each comprise a peak level detector.

5. A speakerphone according to claim 1, wherein the first signal attenuator comprises a first switch device connected in parallel with a first resistance.

6. A speakerphone according to claim 5, wherein the first switch device, which is connected in parallel with the first resistance, comprises an electronic switch.

7. A speakerphone according to claim 5, wherein the first switch device, which is connected in parallel with the first resistance, comprises a mechanical switch.

8. A speakerphone according to claim 5, wherein the second signal attenuator comprises a second switch device connected in parallel with a second resistance.

9. A speakerphone according to claim 8, wherein the second switch device, which is connected in parallel with the second resistance, comprises an electronic switch.

10. A speakerphone according to claim 8, wherein the second switch device, which is connected in parallel with the second resistance, comprises a mechanical switch.

11. A speakerphone according to claim 1, wherein the comparator with hysteresis comprises:

a comparator unit;

an input resistance coupled to an input of the comparator unit; and a feedback resistance connected to the comparator unit in a positive feedback configuration.

12. A speakerphone according to claim 1, wherein:

the first signal attenuator comprises a first switch member connected in series with a first resistance.

13. A speakerphone according to claim 12, wherein:
the second signal attenuator comprises a second switch member connected in series with a second resistance.

14. A speakerphone according to claim 1, wherein:
the second signal attenuator comprises a switch member connected in series with a resistance.

15. A speakerphone according to claim 1 wherein the second signal attenuator comprises a switch device connected in parallel with a resistance.

16. A speakerphone according to claim 15, wherein the switch device of the second signal attenuator, which switch device is connected in parallel with the resistance, comprises an electronic switch.

17. A speakerphone according to claim 15, wherein the switch device of the second signal attenuator, which switch device is connected in parallel with the resistance, comprises a mechanical switch.

18. A speakerphone according to claim 1, wherein the speakerphone includes only one comparator formed by said comparator with hysteresis.

19. A switching type, half duplex, speakerphone, comprising:

a telephone line interface for receiving a receive signal from a telephone line and transmitting a transmit signal to a telephone line, said telephone line interface including a sidetone cancellation circuit for eliminating a substantial portion of the transmit signal from the receive signal;

a receive amplifier for amplifying the receive signal;

a transmit amplifier for amplifying signals from a main microphone to provide the transmit signal;

a main loudspeaker for converting the receive signal to an audible signal;

a first non-linear amplifier for compressing the receive signal to provide a compressed receive signal;

a second non-linear amplifier for compressing the transmit signal to provide a compressed transmit signal;

a first level detector for detecting a level of the receive signal;

a second level detector for detecting a level of the transmit signal;

a comparator with hysteresis for comparing the level of the compressed receive signal with the level of the compressed transmit signal, and providing a comparison output;

a first signal attenuator responsive to a first state of the comparison output to attenuate the receive signal;

a second signal attenuator, responsive to a second state of the comparison output to attenuate the transmit signal;

whereby, when the receive signal is attenuated the transmit signal is unattenuated, and vice-versa;

a telephone handset including a handset loudspeaker and a handset microphone;

a first switch coupled to the main loudspeaker and disconnecting the main loudspeaker from the receive amplifier;

a second switch coupled to the main microphone and disconnecting the main microphone from the transmit amplifier;

a third switch coupled to the handset loudspeaker and connecting the handset loudspeaker to the receive amplifier; and a fourth switch coupled to the handset microphone and connecting the handset microphone to the transmit amplifier.

20. A speakerphone according to claim 19, wherein at least one of the first, second, third and fourth switches comprises an electronic switch.

21. A speakerphone according to claim 19, wherein at least one of the first, second, third and fourth switches comprises a mechanical switch.

22. A method of operating a switching type, half duplex, speakerphone, comprising:

interfacing to a telephone line to obtain a receive signal;

providing a microphone signal for impressing on the telephone line a transmit signal;

compressing both the microphone signal and the receive signal to provide compressed microphone and receive signals;

switching from a transmit mode to a receive mode of operation based on a comparison of the compressed microphone and receive signals, wherein the comparison is performed with a comparator having hysteresis;

causing the speakerphone to remain in a given one of the transmit and receive modes until switching to the other of the transmit and receive modes is instructed based on the comparison of the compressed microphone and receive signals;

attenuating the receive signal when the speakerphone is in the transmit mode; and attenuating the microphone signal when the speakerphone is in the receive mode.

23. A method according to claim 22, further comprising performing the compressing of the microphone and receive signals with logarithmic amplifiers.

24. A method according to claim 22, further comprising:

attenuating the receive signal when the speakerphone is in the transmit mode; and attenuating the microphone signal when the speakerphone is in the receive mode.

25. A method according to claim 24, further comprising:

attenuating the receive and the microphone signals by switching resistors into respective lines carrying the receive and microphone signals.

* * * * *